Aug. 26, 1952   R. J. KELSEY   2,608,417
TRAILER STEERING MECHANISM
Filed Feb. 16, 1950   5 Sheets-Sheet 5
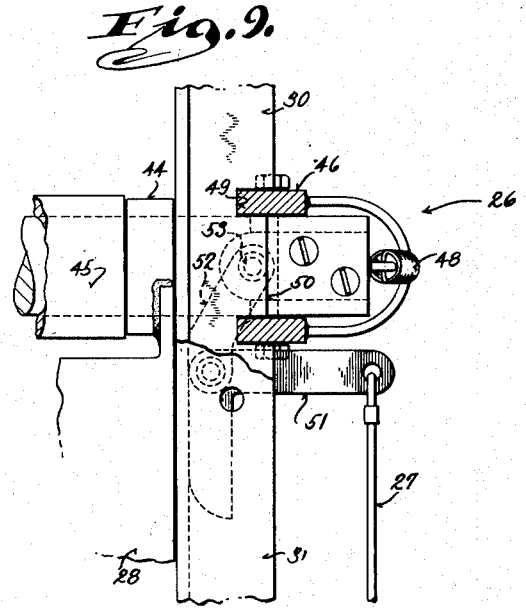
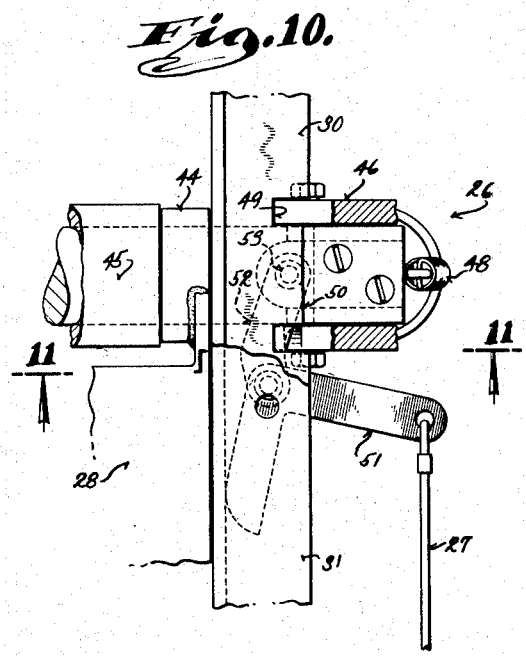
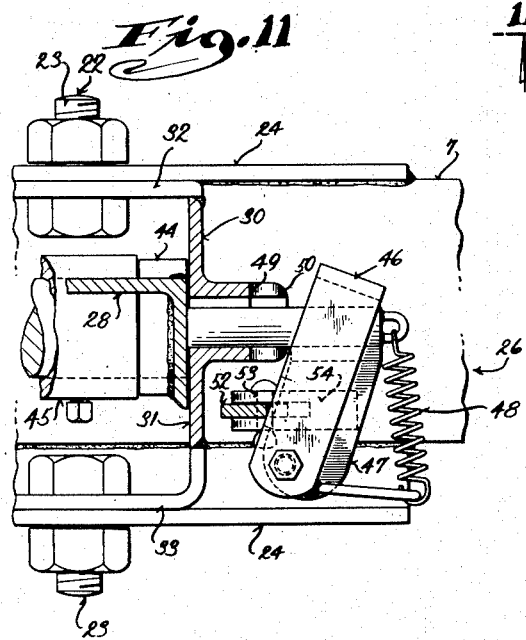
Inventor
Ralph J. Kelsey Patented Aug. 26, 1952

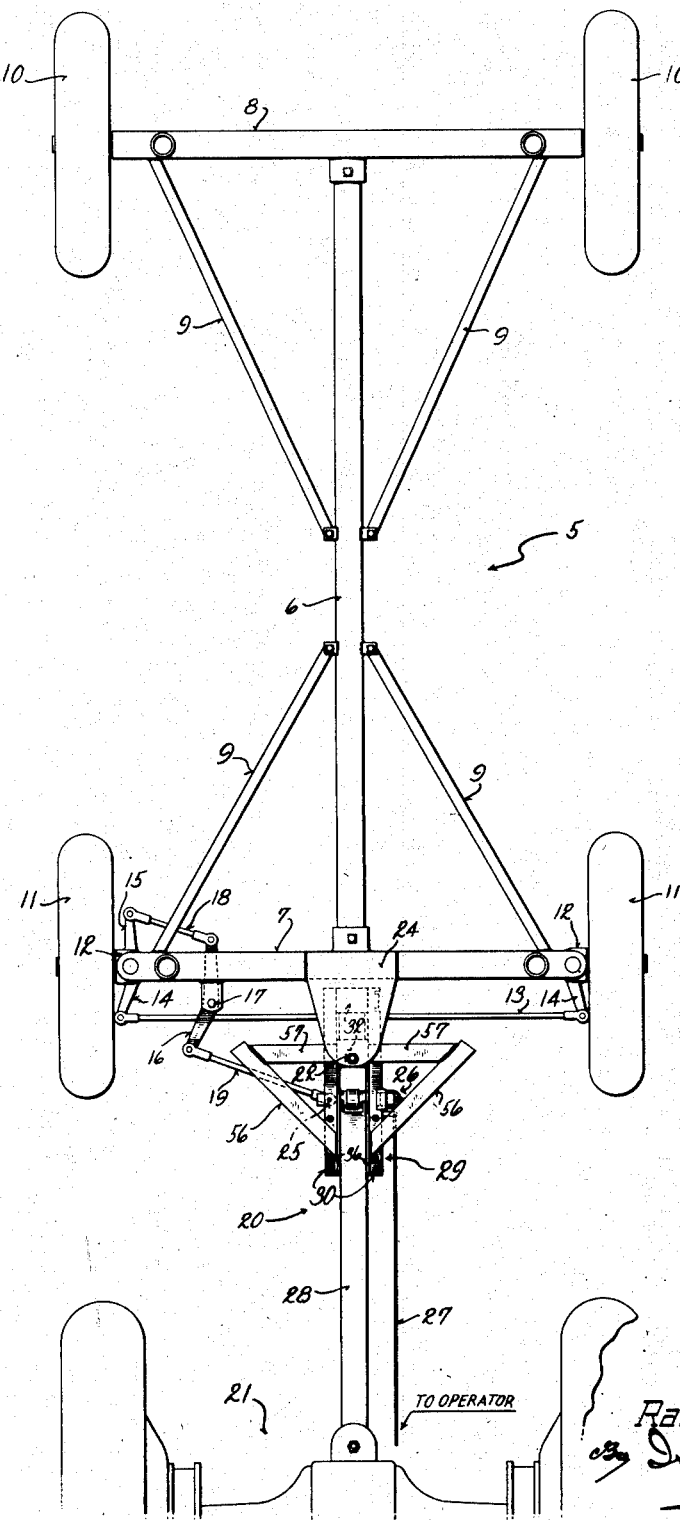

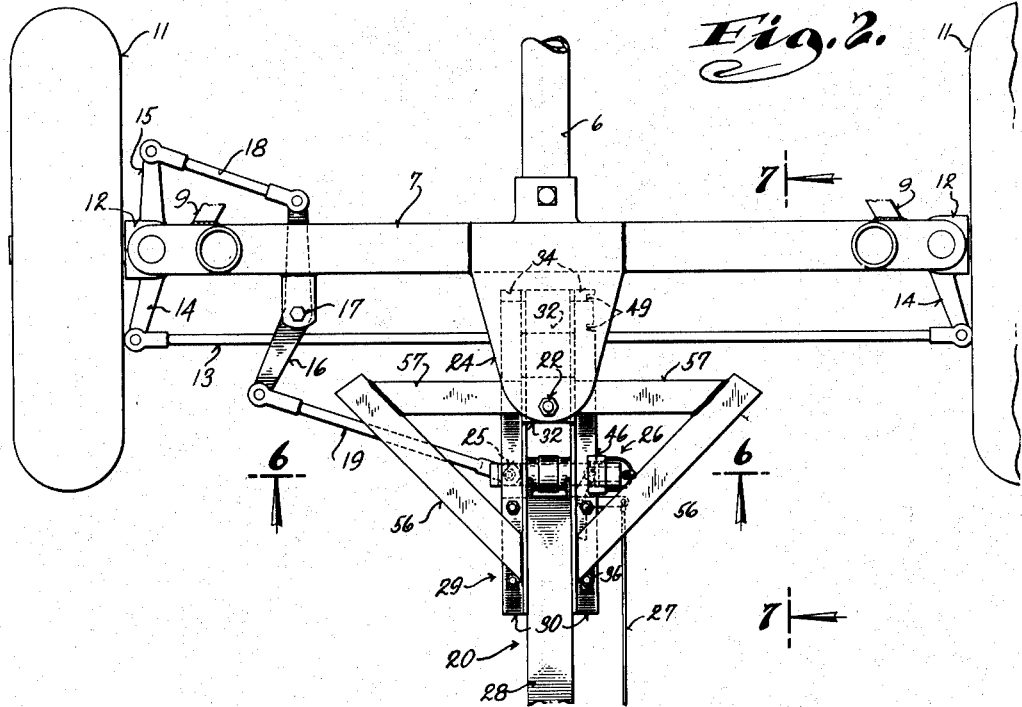
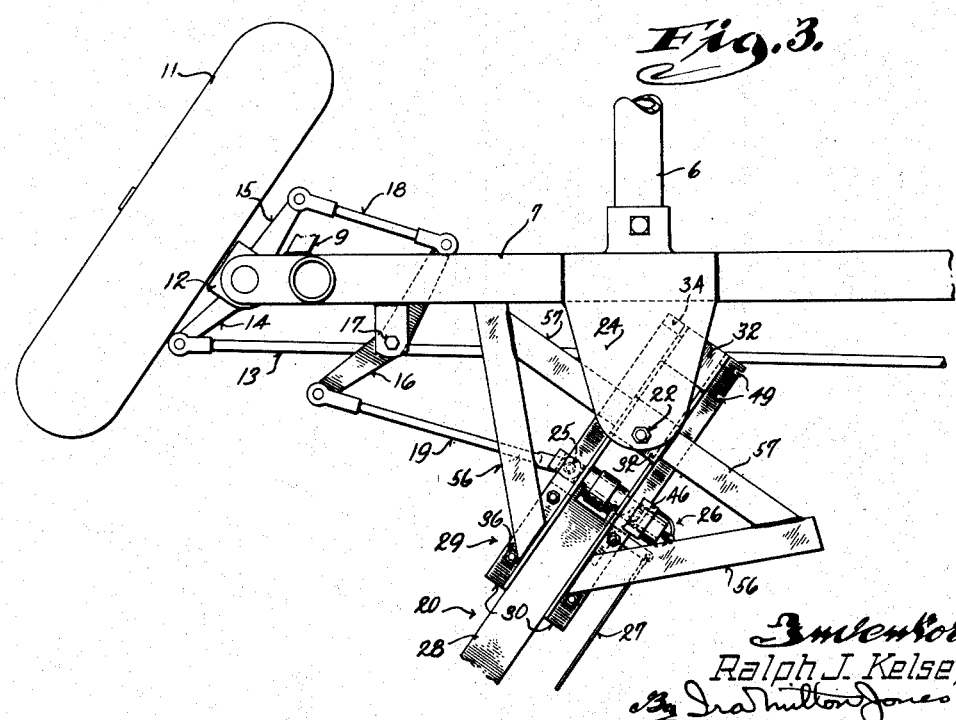

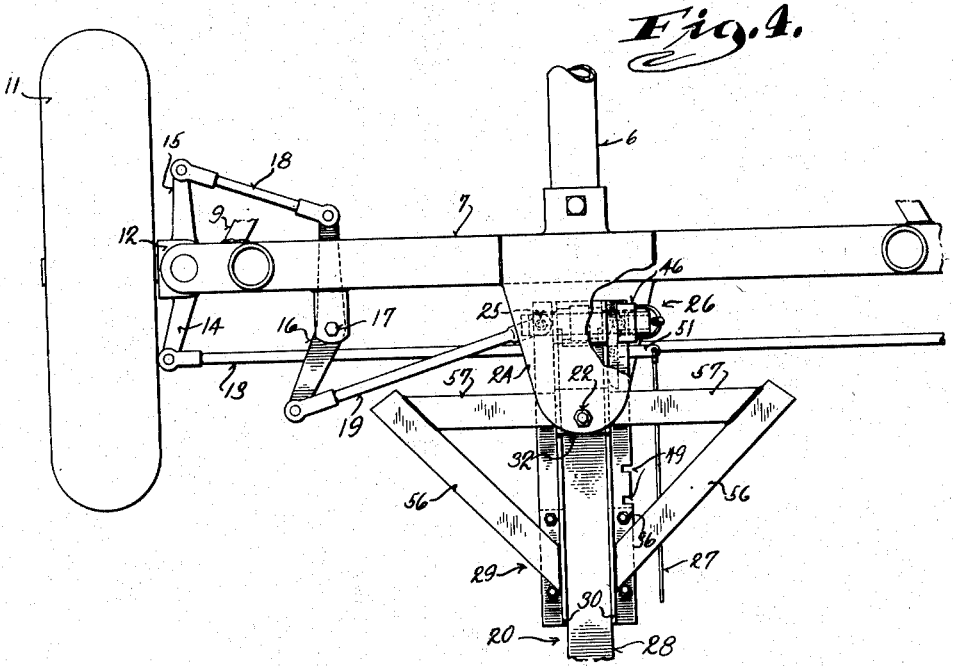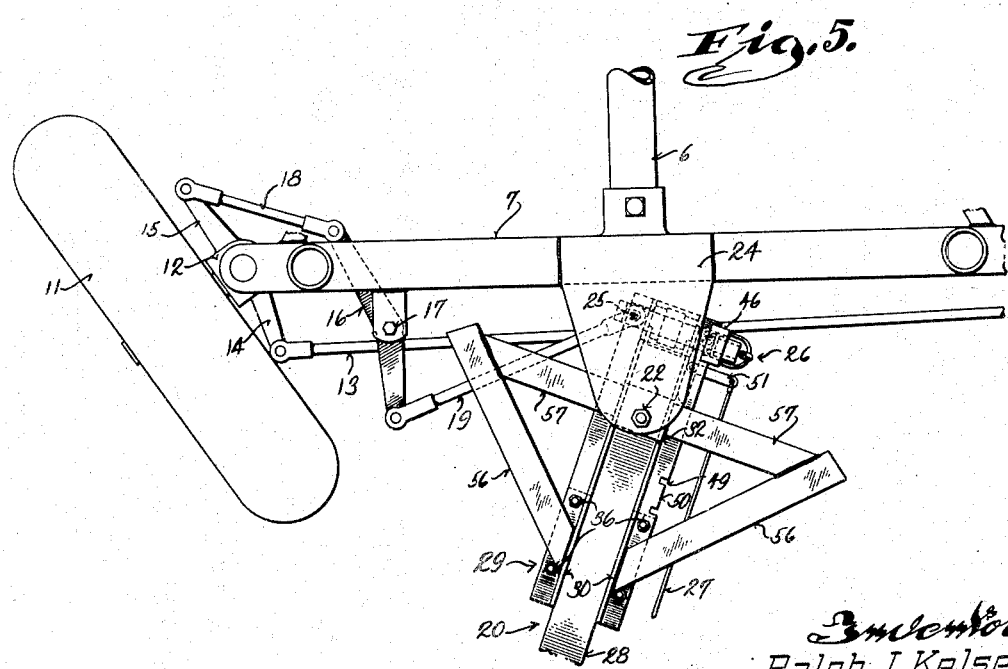

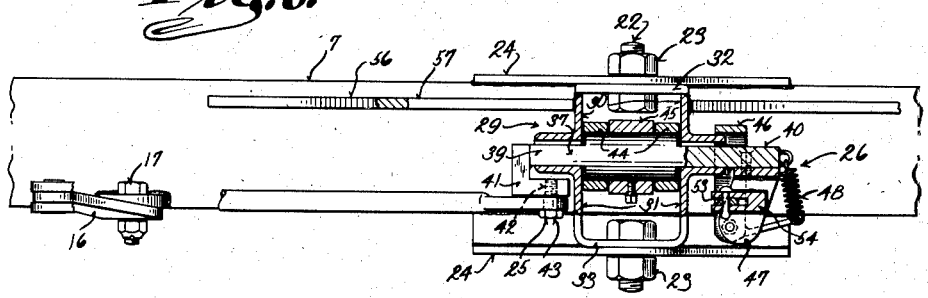

2,608,417

UNITED STATES PATENT OFFICE 2,608,417

TRAILER STEERING MECHANISM

Ralph J. Kelsey, Menominee, Mich., assignor, by mesne assignments, to Steerbak Corporation, La Crosse, Wis.

Application February 16, 1950, Serial No. 144,547

8 Claims. (Cl. 280—33.55)

1

This invention relates to the steering of wheeled vehicles and particularly four-wheeled trailers, and has as its purpose to provide a simple reversible steering mechanism built into the trailer, and through which the backing of a four-wheeled trailer is greatly facilitated.

The front wheels of four-wheeled trailers are now generally of the dirigible type as distinguished from the buggy type wherein the entire front axle swings about the king pin, and the steering linkage for steering the front wheels is connected to the draw bar of the trailer so that as the draw bar swings laterally about its connection with the trailer chassis it turns the wheels in the proper direction as the trailer is towed.

One of the objects of this invention is to provide means whereby the swinging of the draw bar during backing will likewise turn the front wheels in the proper direction to give the trailer the desired direction while being backed by means of and while hitched to the tractor or automobile towing it.

Another object of this invention is to provide means automatically reversed and placed in proper steering relationship for backing merely by rearward force on the draw bar, and automatically restored to proper steering relationship for normal forward running by a pull on the draw bar.

Another object of this invention is to provide a trailer having a reversible steering mechanism built therein to facilitate steering the same in backing as well as in normal forward running and which is so designed and constructed that it may be embodied in a trailer of the farm wagon type at an inconsequential cost.

Still another object of this invention is to provide a steering mechanism for trailers of the character described which is rugged and fully capable of withstanding the hard usage to which equipment of this type is subjected.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which:

Figure 1 is a top plan view of a trailer chassis of the farm wagon type embodying this invention and illustrating the same attached to a tractor;

Figure 2 is an enlarged top plan view of the front end portion of the trailer chassis shown in Figure 1 and illustrating the steering mechanism in its condition for forward travel of the trailer;

Figure 3 is a view similar to Figure 2 but illustrating the manner in which the swinging of the draw bar turns the front wheels in the same direction the bar is swung;

Figure 4 is a view similar to Figure 2 but illustrating the steering mechanism in its position for backing;

Figure 5 is a view similar to Figure 3 illustrating how the swinging of the draw bar, when the steering mechanism is reversed, turns the front wheels in the opposite direction to facilitate backing the trailer;

Figure 6 is a detail sectional view through Figure 2 on the plane of the line 6—6;

Figure 7 is a detail sectional view through Figure 2 on the plane of the line 7—7;

Figure 8 is an exploded perspective view of the latch structure by which the draw bar is releasably held in either a forward running or backing position;

Figure 9 is a horizontal sectional view through the latch mechanism illustrating the same engaged;

Figure 10 is a view similar to Figure 9 but showing the latch disengaged; and

Figure 11 is a detail sectional view through Figure 10 on the plane of the line 11—11.

Referring now particularly to the accompanying drawings in which like numerals indicate like parts throughout the several views, the numeral 5 designates the chassis of a four-wheeled trailer having a main central longitudinal frame member 6 connecting front and rear axles 7 and 8. Rigidity is afforded this structure by diagonal struts or tie bars 9.

The rear axle 8 has the rear wheels 10 journalled thereon in any suitable manner, and the front wheels 11, as is customary, are of the dirigible type and are mounted on the outer ends of the front axle 7 by the usual steering knuckles 12. A tie bar 13 connecting forwardly extending arms 14 on the steering knuckles connects the two front wheels to turn in unison. The tie bar 13 may be said to constitute part of the steering linkage by which the front wheels 11 are steered. The remainder of the steering linkage, in that embodiment of the invention shown in Figures 1 through 11, inclusive, comprises a rearwardly extending arm 15 on one of the steering knuckles 12 and a medially pivoted lever 16 mounted to swing about a pivot 17 fixed to the front axle. The rear end of the lever 16 is connected by a link 18 with the arm 15 and its front end is connected through a link 19 with the draw bar 20 of the trailer and by which the trailer may be hitched to a tractor or other towing unit 21.

The draw bar 20, as is customary, is pivotally connected with the chassis by means of a king pin 22 which, in the embodiment of the invention shown in Figures 1 to 11, comprises two axially aligned bolts 23 passing through superimposed spaced apart upper and lower plates 24 fixed to and extending forwardly from the front axle 7.

The link 19 through which lateral swinging motion of the draw bar is transmitted to the steering linkage is pivotally connected with the draw bar as at 25; and by shifting this point of connection 25 from a location forwardly of the king pin to a location rearwardly thereof the mechanism is quickly reversed to facilitate steering of the trailer during backing. For normal forward operation of the trailer the point of connection 25 is forward of the king pin so that as the draw bar 20 is swung laterally the front wheels turn in the same direction that the bar is swung.

For backing up without detaching the trailer from the tractor or other towing vehicle it is desirable that the front wheels turn in a direction opposite that in which the draw bar is swung. This is accomplished by shifting the point of connection 25 between the draw bar and the steering linkage rearwardly of the king pin. It is, of course, essential that the draw bar be releasably held in either its forward running or its backing positions and to this end a novel latch designated generally by the numeral 26 is provided, this latch being releasable by the operator of the tractor by a pull upon a lanyard or cord 27.

The draw bar proper comprises a length of channel iron 28 slidably received in a frame designated generally by the numeral 29. This frame is received between the plates 24 and is pivotally connected to the chassis by the king pin comprising the bolts 23. Specifically, the frame 29 comprises two upper parallel angle irons 30 and two lower parallel angle irons 31. These four angle irons are connected together and held in fixed parallel relationship to one another.

The upper angle irons are bridged by cross pieces 32 welded to their upstanding flanges and the lower angle irons 31 are bridged by U-shaped connectors 33 welded to their vertical flanges. The members 32 and 33 are vertically aligned and are spaced apart a distance to fit neatly between the plates 24, the king pin bolts 23 passing through the front members 32 and 33. The thus connected pair of top angle irons 30 are secured to the connected bottom angle irons 31 by permanent spacers 34 at the rear end of the frame and removable spacers 35 at the front end of the frame, the spacers 35 being held in place by bolts 36.

The space between the upper and lower angle irons accommodates a cross pin 37 to which the rear end of the channel iron 28 (which provides the draw bar proper) is pivoted. As best shown in Figure 8 the cross pin 37 has a cylindrical medial portion 38 and flat end portions 39 and 40, each of a thickness to slidably fit between the top and bottom angle irons. The end portion 39 has a bracket 41 fixed thereto to underlie the horizontal flange of the adjacent bottom angle iron 31 and is tapped as at 42 to receive a pivot screw 43 which provides the connection 25 between the link 19 of the steering linkage and the draw bar. Thus the tapped hole 42 and the pivot screw 43 either together or separately may be said to constitute pivot defining means on the draw bar.

The pivoal connection between the pin 37 and the draw bar is established by two spaced collars or rings 44 welded to the flanges of the draw bar and encircling the cylindrical portion 38 of the pin. Attention is directed to the fact that the cylindrical portion 38 of the pin has a collar 45 fixed thereto between the collars or rings 44 so that end thrust imposed upon the pin 37 is carried into the frame structure, i. e., the pairs of upper and lower superimposed angle irons through the collars or rings 44. This holds the pin 37 and consequently the draw bar centered between the sides of the frame and assures freer operation.

The latch 26 which holds the draw bar and consequently the pivotal connection 25 between the draw bar and the steering linkage in one or the other of its two positions comprises a U-shaped structure 46 embracing and pivoted to a U-shaped bracket 47 fixed to the underside of the flat end portion 40 of the pin 37.

The upper end portions of the legs of the U-shaped member 46 extend across the edges of the horizontal flanges of the adjacent top and bottom angle irons 30 and 31 and are yieldingly urged against these edges by a spring 48. In either of the two positions of endwise adjustment of the draw bar these arms of the latch member 46 engage in notches or keeper recesses 49 in the edges of the horizontal flanges of the angle irons. When the latch is so engaged the pin 37 is firmly held against either forward or rearward motion; and the notches 49 are so located with respect to the kind pin 22 that in the normal forward running position of the draw bar the connection 25 between the steering linkage and the draw bar is forwardly of the king pin a distance sufficient to impart the desired steering motion to the linkage in consequence to lateral swinging of the draw bar and when the draw bar is shifted to its rearmost position for backing the connection 25 is spaced rearwardly of the king pin a distance sufficient to translate lateral swinging of the draw bar into the desired steering motion of the linkage.

As noted the spring 48 yieldingly urges the latch member 46 toward and into engagement with the horizontal flanges of the angle irons 30 and 31. Thus, upon disengagement of the latch from a set of keeper notches 49 the latch member will ride along thte edge of the lowermost angle iron to automatically drop into the other set of keeper notches. To assure such engagement and preclude undesired engagement of the leading arm of the latch with the first encountered notch 49, the edges of the horizontal flanges of the angle irons 30 and 31 are cut back between the notches as at 50.

Release of the latch by a pull upon the lanyard or cord 27 is effected by means of a bell-crank lever 51 pivoted to the free end of a lever 52 which in turn is pivoted as at 53 between the arms of a bifurcated mounting block 54 fixed between the arms of the bracket 47. The lever 52 extends across the inner edge of one of the arms of the U-shaped latch member 46 which is preferably rounded as at 55 where the lever 52 contacts it. Hence, outward swinging movement of the lever 52 forces the latch 46 outwardly to disengage the same from its keeper recesses. Such outward swinging movement is imparted to the lever 52 by a pull on the lanyard or cord 27 which is attached to one arm of the bell-crank lever 51.

The other arm of the bell-crank lever 51 bears against the vertical flange of the adjacent lower angle iron 31. Thus, a pull on the cord rocks the bell-crank lever about its engagement with the angle iron 31 and, of course, with respect to the lever 52 which is thereby swung outwardly.

When the latch is disengaged so that the draw bar is free to be shifted endwise the engagement of the draw bar between the spaced apart vertical flanges of the angle irons 30 and 31 coacts with the engagement of the flat end portions 39 and 40 of the pin 37 between the horizontal flanges of the angle irons to guide the motion of the draw bar, the arrangement being such that the cross pin 37 at all times is perpendicular to the longitudinal axis of the frame 29.

As will be readily apparent, the spacers 35 are removable to permit the assembly of the cross pin with the frame formed essentially by the longitudinal angle irons 30 and 31.

Lateral swinging of the draw bar about the king pin is preferably limited and for this purpose diagonally extending stops 56 extend from the sides of the frame 29 to abut the front of the axle as shown, for instance, in Figure 3, the diagonal stops being reinforced by struts 57. The diagonal stops 56 and the struts 57 also serve to stiffen the frame 29 against being spread apart by lateral force on the draw bar.

From the foregoing description taken in connection with the accompanying drawings, it will be readily apparent to those skilled in the art that this invention provides a readily reversible steering mechanism for four-wheeled trailers which is quickly and automatically shifted into proper condition for backing or forward motion as a result of a rearward push or a forward pull upon the draw bar, providing, of course, that the latch holding the mechanism in either of its two positions has been first released. It will also be readily apparent that this mechanism is extremely simple and readily adaptable to the rugged use to which devices of this type are apt to be subjected.

It will also be readily apparent that although the invention no doubt finds its greatest utility in its application to trailers per se, it is equally useful when adapted to other towed vehicles which ordinarily are not classified as trailers as, for instance, such farm machinery as hay loaders and manure spreaders. It is, therefore, to be understood that where the term trailer is used in this specification and the claims, it embodies any and all towed vehicles where the problem of steering during backing is encountered.

What I claim as my invention is:

1. In a trailer having a chassis, and a pair of dirigible type wheels: a king pin on the chassis between said wheels; a drawbar; means providing a draft connection between the drawbar and the king pin, and connecting the drawbar with the king pin for swinging movement about the axis thereof; steering linkage connected with the wheels and including an actuating link having one end thereof adjacent to the drawbar and near the king pin; a steering control member pivotally connected to said end of the actuating link; and mounting means on the drawbar supporting and guiding the steering control member for movement relative to said mounting means in a direction lengthwise of the drawbar, between positions selectively disposing its pivotal connection with the actuating link forwardly or rearwardly of the king pin axis, said mounting means constraining the steering control member to swing sidewise with the drawbar so that the wheels are swung to right or left in consequence to sidewise swinging movement of the drawbar in one direction, depending upon whether the pivotal connection between the steering control member and the actuating link is forwardly or rearwardly of the king pin axis.

2. The trailer set forth in claim 1 further characterized by the provision of latch means on the drawbar for releasably securing the steering control member against movement relative to its mounting means in the direction lengthwise of the drawbar with the pivotal connection between the steering control member and the actuating link either forwardly or rearwardly of the king pin axis.

3. In a trailer having a chassis, and a pair of dirigible type wheels: a king pin carried by the chassis between said wheels; a drawbar having one end adjacent to the king pin; guide means on said end of the drawbar pivotally connected to the king pin to provide a draft connection between the drawbar and the chassis and to swing from side to side with the drawbar about the axis of the king pin, said guide means having surfaces extending longitudinally of the drawbar and providing a slideway extending forwardly and rearwardly of the king pin; a steering control member on the guide means and engaging the slideway forming surfaces thereof to be thereby guided for sliding movement between positions forwardly and rearwardly of the king pin axis; steering linkage connected with the wheels and including an actuating link; and a pivotal connection between the actuating link and said steering control member by which the wheels are swung to right or left in consequence to sidewise swinging movement of the drawbar and the guide means in one direction, depending upon whether said steering control member is disposed forwardly or rearwardly of the king pin axis.

4. The trailer set forth in claim 3, further characterized by the provision of a hinge connection between the drawbar and the guide means providing for up and down swinging of the drawbar with respect to said guide means.

5. The trailer set forth in claim 3 further characterized by the provision of latch means on the drawbar for releasably holding said steering control member against sliding motion relative to its guide means in positions either forwardly or rearwardly of the king pin axis.

6. The trailer set forth in claim 3 wherein said steering control member comprises a pin constrained to sidewise sliding motion along the slideway of the guide means with the axis of the steering control pin crosswise of the king pin axis; and further characterized by a connection between the drawbar and the steering control pin providing for up and down swinging motion of the drawbar about the axis of the steering control pin relative to the guide means.

7. In a trailer having a chassis, an axle, and a pair of dirigible type wheels on the ends of the axle: a king pin carried by said axle; a frame connected to said king pin and constrained thereby to swing from side to side about the axis of the king pin, said frame having means thereon defining a slideway extending forwardly and rearwardly of the king pin; a drawbar connected at one end with the frame to swing therewith about the king pin axis and to transmit endwise force on the drawbar to the axle through the frame and the king pin; steering linkage connected with the wheels; and means for actuating said steering linkage in consequence to sidewise swinging movement of the drawbar and frame, comprising a steering control member engaged in said slideway of the frame to be guided thereby for sliding movement between positions forwardly and rearwardly of the king pin, and to swing sidewise with the frame, and a pivotal connection between the steering linkage and said steering control member by which the wheels are swung either in one direction or in the reverse direction in consequence to sidewise swinging movement of the drawbar and frame in one direction, depending upon whether said steering control member is positioned forwardly or rearwardly of the king pin axis.

8. In a trailer having a chassis, an axle, and a pair of dirigible type wheels on the ends of the axle: a king pin carried by said axle; a frame pivoted on said king pin to swing from side to side about the king pin axis; means on said frame defining a slideway lying crosswise of the axis of the king pin and extending both forwardly and rearwardly thereof; a drawbar connected with said frame for swinging movement therewith about the axis of the king pin; a steering control element received in said slideway of the frame so as to be guided thereby for sliding motion relative to the frame between positions either forwardly or rearwardly of the king pin axis; steering linkage connected with the wheels; a pivotal connection between the steering linkage and said steering control element; and cooperating latch means on the steering control element and said frame for releasably securing the steering control element to the frame in both its forward and rearward positions.

RALPH J. KELSEY.

REFERENCES CITED

The following references are of record in the file of this patent:

UNITED STATES PATENTS

| Number | Name | Date |
|---|---|---|
| 1,856,997 | Jacobs | May 3, 1932 |
| 2,047,206 | Knapp | July 14, 1936 |